(12) United States Patent
Pearson

(10) Patent No.: US 12,532,981 B2
(45) Date of Patent: Jan. 27, 2026

(54) COOKING APPARATUS USING LIQUID BATH

(71) Applicant: Carl P. Pearson, Edmonds, WA (US)

(72) Inventor: Carl P. Pearson, Edmonds, WA (US)

(73) Assignee: Iceberg Point Ventures, LLC, Seattle, WA (US)

( * ) Notice: Subject to any disclaimer, the term of this patent is extended or adjusted under 35 U.S.C. 154(b) by 321 days.

(21) Appl. No.: 17/011,616

(22) Filed: Sep. 3, 2020

(65) Prior Publication Data

US 2020/0397175 A1    Dec. 24, 2020

Related U.S. Application Data

(63) Continuation of application No. 13/840,534, filed on Mar. 15, 2013, now Pat. No. 10,863,848.

(51) Int. Cl.
| | | |
|---|---|---|
| *A47J 27/00* | (2006.01) | |
| *A47J 27/024* | (2006.01) | |
| *A47J 27/10* | (2006.01) | |

(52) U.S. Cl.
CPC ........... *A47J 27/002* (2013.01); *A47J 27/024* (2013.01); *A47J 27/10* (2013.01)

(58) Field of Classification Search
CPC ........ A47J 21/002; A47J 21/024; A47J 21/10; A47J 31/46; A47J 27/18; A47J 27/002; A47J 27/024; A47J 27/10; A47J 27/00; C08J 2327/18; C08J 3/16; C08J 9/00; C08F 14/26; C08F 2/16; C08F 2/18; C08F 2/20; C08F 2/30; C08F 214/26; C08F 214/265; C08F 265/04; C08F 2/44; C08F 263/02; C08F 265/02; C08F 265/06; C08L 2205/03; C08L 27/18; C08L 31/04; C08L 33/02; C08L 33/10; C08L 91/08; D01B 7/00; D01F 4/00; D01F 4/02; D01C 3/02; D01C 3/00; D04H 1/4266; G06Q 10/10; G06Q 30/0185; G06Q 30/0601; G06Q 30/0611; G06Q 30/0635; G06Q 30/0641;
(Continued)

(56) References Cited

U.S. PATENT DOCUMENTS

| | | |
|---|---|---|
| 3,332,338 A | 7/1967 | Wein |
| 3,742,178 A | 6/1973 | Harnden, Jr. |
| 3,888,303 A | 6/1975 | Skala |

(Continued)

FOREIGN PATENT DOCUMENTS

WO    WO2007122900 A1    11/2007

OTHER PUBLICATIONS

Henry, Alan, "Cook Salmon Sous-Vide in Your Kitchen Sink for No-Fuss, Healthy Eats", Lifehacker, retrieved from https://lifehacker.com/cook-salmon-sous-vide-in-your-kitchen-sink-for-no-fuss-5830856 on Aug. 15, 2011, 3 pages.

(Continued)

*Primary Examiner* — Edward F Landrum
*Assistant Examiner* — Adam M Eckardt
(74) *Attorney, Agent, or Firm* — Lee & Hayes, P.C.

(57) ABSTRACT

A sous vide system including a container having an amount of liquid therein with at least first and second temperature zones, first and second temperature sensors for the first and second temperature zones and a control unit for maintaining the temperature of the liquid in the first and second temperature zones using heating and/or cooling units.

20 Claims, 19 Drawing Sheets

(58) Field of Classification Search
CPC ...... G06Q 30/00; A01K 67/033; C11D 11/00; D01D 5/06; D06M 13/144
See application file for complete search history.

(56) References Cited

U.S. PATENT DOCUMENTS

| | | | |
|---|---|---|---|
| 3,908,111 A | | 9/1975 | Du Bois |
| 4,762,060 A | | 8/1988 | Santa Cruz |
| 5,097,759 A | * | 3/1992 | Vilgrain .................. A47J 17/18 99/410 |
| 5,123,337 A | | 6/1992 | Vilgrain |
| 5,280,748 A | * | 1/1994 | Pardo ....................... A23L 3/10 99/330 |
| 5,340,471 A | | 8/1994 | Wilson |
| 5,361,683 A | | 11/1994 | Silvestrini |
| 5,421,246 A | | 6/1995 | Tippmann et al. |
| 5,445,062 A | * | 8/1995 | Polster .................... A47J 27/10 99/348 |
| 5,542,344 A | * | 8/1996 | Koether .................. A23L 3/375 99/333 |
| 6,056,985 A | | 5/2000 | Fluckiger |
| 6,505,546 B1 | * | 1/2003 | Koether .............. A47J 27/0802 99/336 |
| 7,376,485 B2 | | 5/2008 | Salerno |
| 10,863,848 B2 | | 12/2020 | Pearson |
| 2005/0044625 A1 | * | 3/2005 | Kommers .............. G05D 23/19 4/654 |
| 2005/0121434 A1 | | 6/2005 | Kim |
| 2007/0006376 A1 | | 1/2007 | Bartosik |
| 2008/0066624 A1 | | 3/2008 | Taylor |
| 2008/0260557 A1 | | 10/2008 | Austin et al. |
| 2009/0049992 A1 | | 2/2009 | Chien |
| 2009/0126580 A1 | * | 5/2009 | Hartfelder ............. A47J 39/006 99/483 |
| 2010/0269341 A1 | | 10/2010 | Stewart et al. |
| 2010/0326286 A1 | | 12/2010 | Romero |
| 2010/0326623 A1 | | 12/2010 | Azzam |
| 2011/0017078 A1 | * | 1/2011 | O'Connell ............. A47J 27/05 99/448 |
| 2011/0117259 A1 | | 5/2011 | Storek |
| 2011/0175737 A1 | | 7/2011 | Pforte et al. |
| 2011/0185915 A1 | * | 8/2011 | Eades ............... A47J 27/21058 99/331 |
| 2011/0186283 A1 | | 8/2011 | Preston |
| 2011/0247970 A1 | | 10/2011 | Evingham |
| 2014/0260998 A1 | | 9/2014 | Pearson |
| 2020/0397176 A1 | | 12/2020 | Pearson |
| 2021/0076861 A1 | | 3/2021 | Pearson |

OTHER PUBLICATIONS

Office Action for U.S. Appl. No. 13/840,534, mailed on Jan. 31, 2020, Carl P. Pearson, "Cooking Apparatus Using Liquid Bath," 45 pages.

Office Action for U.S. Appl. No. 17/011,782, mailed on Feb. 16, 2023, Carl P. Pearson, "Cooking Rack System Using Liquid Bath", 21 pages.

Office Action for U.S. Appl. No. 17/108,337, mailed on Mar. 8, 2023, Carl P. Pearson, "Cooking Apparatus Using Liquid Bath," 38 pages.

Office Action for U.S. Appl. No. 17/108,337, mailed on Mar. 13, 2024, Carl P. Pearson, "Cooking Apparatus Using Liquid Bath," 37 pages.

Office Action for U.S. Appl. No. 17/011,782, mailed on Apr. 28, 2023, Carl P. Pearson, "Cooking Rack System Using Liquid Bath," 28 pages.

Office Action for U.S. Appl. No. 13/840,534, mailed on May 16, 2019, Carl P. Pearson, "Cooking Apparatus Using Liquid Bath," 44 pages.

Office Action for U.S. Appl. No. 13/840,534, mailed on May 18, 2016, Carl P. Pearson, "Cooking Apparatus Using Liquid Bath," 25 pages.

Office Action for U.S. Appl. No. 13/840,534, mailed on Jun. 12, 2017, Carl P. Pearson, "Cooking Apparatus Using Liquid Bath," 32 pages.

Office Action for U.S. Appl. No. 13/840,534, mailed on Jul. 13, 2020, Carl P. Pearson, "Cooking Apparatus Using Liquid Bath," 72 pages.

Office Action for U.S. Appl. No. 17/011,782, mailed on Oct. 11, 2022, Carl P. Pearson, "Cooking Rack System Using Liquid Bath," 29 pages.

Office Action for U.S. Appl. No. 13/840,534, mailed on Oct. 31, 2016, Carl P. Pearson, "Cooking Apparatus Using Liquid Bath," 26 pages.

Office Action for U.S. Appl. No. 17/108,337, mailed on Nov. 10, 2022, Carl P. Pearson, "Cooking Apparatus Using Liquid Bath," 46 pages.

Office Action for U.S. Appl. No. 13/840,534, mailed on Nov. 21, 2018, Carl P. Pearson, "Cooking Apparatus Using Liquid Bath," 37 pages.

Office Action for U.S. Appl. No. 17/108,337, mailed on Dec. 6, 2023, Carl P. Pearson, "Cooking Apparatus Using Liquid Bath," 45 pages.

Office Action for U.S. Appl. No. 13/840,534, mailed on Dec. 7, 2017, Carl P. Pearson, "Cooking Apparatus Using Liquid Bath," 35 pages.

Office Action for U.S. Appl. No. 17/108,337, mailed on Nov. 26, 2024, Pearson, "Cooking Apparatus Using Liquid Bath", 35 pages.

* cited by examiner

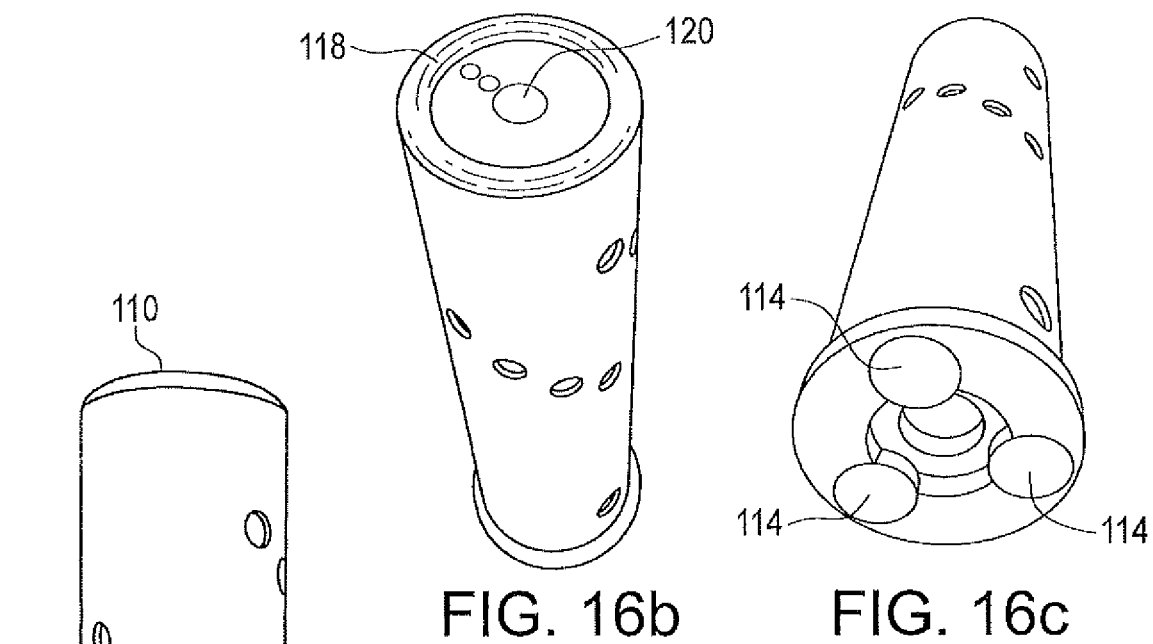
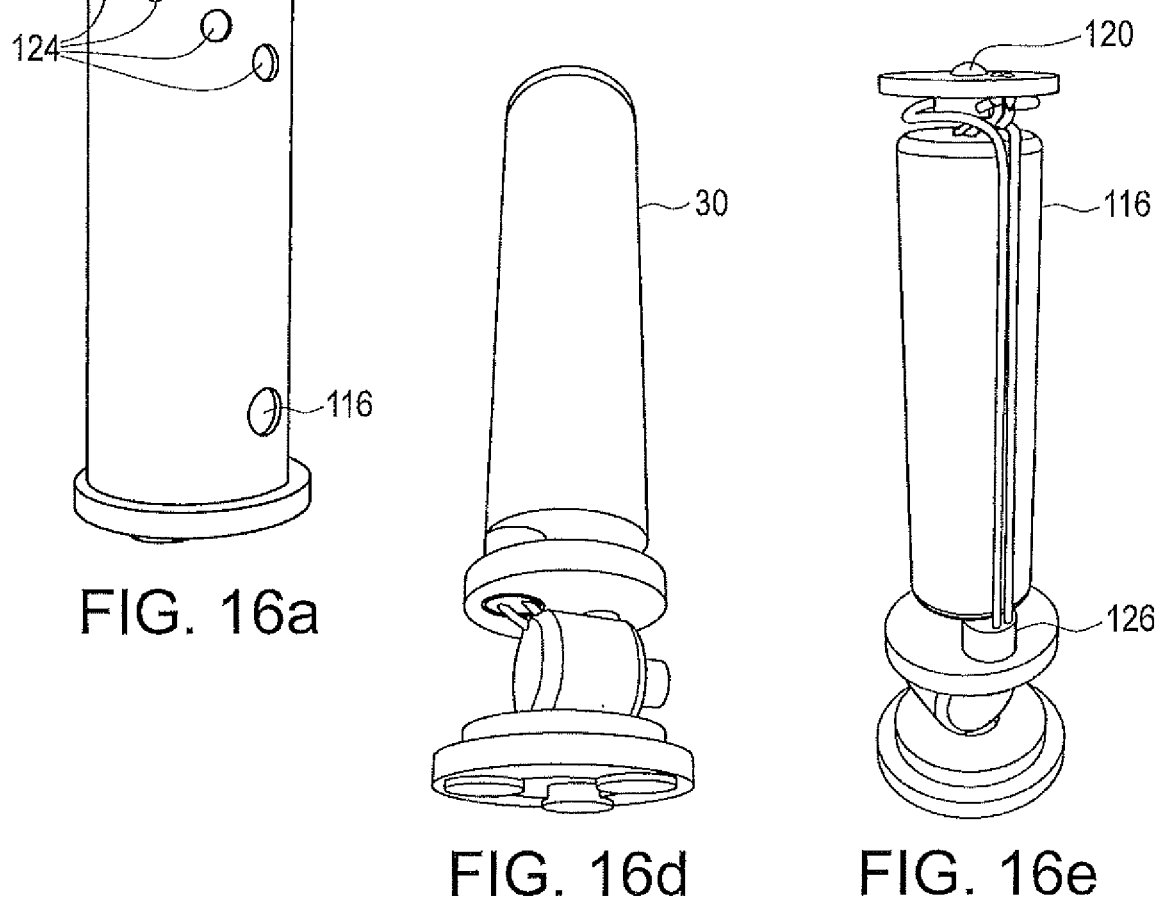
FIG. 16b    FIG. 16c
FIG. 16a    FIG. 16d    FIG. 16e

COOKING APPARATUS USING LIQUID BATH

PRIOR APPLICATION

This is a continuation of U.S. patent application Ser. No. 13/840,534 filed Mar. 15, 2013.

TECHNICAL FIELD

This invention relates generally to cooking appliances/systems, and more particularly concerns such appliances and/or systems using a water/liquid bath.

BACKGROUND OF THE INVENTION

In the various fields of cooking techniques and appliances, a hot water/liquid bath has been used to cook food using very accurate water temperatures. Typically the cooking occurs over a relatively long period of time, up to 72 hours in some cases, and at low temperatures, with the food submerged in plastic bags and typically vacuum-sealed. Examples of food cooked include all types of meat and fish, chicken, eggs and vegetables. Fish, eggs and tender cuts of meat and chicken may be cooked in as little as 20 minutes, up to a few hours. This cooking technique is typically known by the French term "sous vide", which means cooking under pressure. This technique has been used in fine cuisine preparation because of the precise control of the cooking temperature, producing cooking benefits which have not been achieved heretofore with traditional cooking techniques, such as baking, braising, etc. Other examples of cooking using a water/liquid bath include "bain-marie" techniques, in which a pan or inner container with food is placed in an outer container of hot water. This bain-marie technique is useful for melting chocolate, making custards and cheesecakes or holding food at serving temperatures.

A number of sous vide cooking appliances are commercially available and are suitable for home or commercial use. Some of these include dedicated stand-alone appliances, which have the disadvantage of being single-function appliances which require a lot of space on a countertop as well as for storage when not in use. Such systems must be individually filled with water, typically by hand-pouring, and then must be emptied after each use. This can be both difficult and inconvenient. Since they are a fixed size, they also lack the capability to conveniently handle diverse quantities/sizes of food to be cooked.

Another sous vide appliance is an immersion circulator-style portable heater that can be clamped onto the side of a cooking pot or container. While this type of system overcomes some of the limitations of fixed container size appliances noted above, it still has significant limitations. Such a unit is quite heavy and must be securely clamped to the edge of the cooking container in order to be safely used. The overall system may become unstable if the container is too small or require a larger than desirable container to accommodate the size of the heater. The immersion system is also a single-purpose appliance that requires considerable space and must be stored when not actually in use. Typically, immersion circulator systems have fixed minimum and maximum water levels which may not be suitable for cooking certain items or for use with shallow pans. Other kitchen appliances, such as coffee makers, are single purpose and heat water for one purpose. Electric pressure cookers, rice cookers, tea kettles and crock pots are other examples of single purpose cooking appliances.

Alternatively, it would also be desirable to increase the flexibility of the minimum and maximum water levels of a water/liquid cooking appliance to adapt to various cooking requirements. Further, it would be desirable to control where the input and output ports occur and also to have multiple intake and output ports to accommodate multiple zones of cooking. Still further, it would be desirable to be able to measure the water temperature at various points within the bath and at locations very near the food bag, even within the food bag itself. In addition, it would be desirable to have a heat source which does not come into contact with the water in order to protect the heat source from damage and to eliminate extensive cleaning after each use. It would also be desirable in some situations to use an existing single purpose appliance for another cooking technique, in order to save space and eliminate the cost of another dedicated single purpose appliance.

Also, it is desirable in some cases to have a convection system for heating and dispersing hot water without the need for a separate pumping system. A limitation of existing sous vide systems is that they are all designed to heat the water bath to a single temperature and to maintain that temperature uniformly throughout the water bath. In cases where it is desirable that multiple cuts of meat be cooked to different temperatures (doneness), multiple baths would be required or a less than desirable single compromise temperature would be necessary.

DISCLOSURE OF THE INVENTION

Accordingly, a sous vide system, comprising: a container adapted for sous vide operation having an amount of liquid present therein with at least first and second different temperature zones distinct from one another in the amount of liquid in the container, wherein the sous vide system includes 1) at least two heating units or 2) at least one heating unit and one cooling module to produce said at least first and second different temperature zones having different temperatures in the amount of liquid in the container, wherein the heating units are adapted to heat the liquid within a temperature range of 120° F. to 160° F. for sous vide cooking; a temperature control unit coupled to said at least two heating units or at least one heating unit and one cooling module; and first and second temperature sensors providing feedback to the temperature control unit for the first and second temperature zones, wherein the first temperature sensor is adapted to monitor the temperature of the amount of liquid or a first foodstuff present in the amount of liquid in the first temperature zone and the second temperature sensor is adapted to monitor the temperature of the amount of liquid or a second foodstuff present in the amount of liquid in the second temperature zone, wherein the temperature control unit is responsive to the first and second temperature sensors and is adapted to control the liquid temperature in the first and second temperature zones to different temperatures for respective periods of time to reach established target temperatures for the first and second foodstuffs in the first and second temperature zones.

BRIEF DESCRIPTION OF THE DRAWINGS

FIG. 16A is a front elevational view of a recirculation pump used in a sous vide appliance.

FIG. 16B is an upper perspective view of the recirculation pump of FIG. 16A.

FIG. 16C is a lower perspective view of the recirculation pump of FIGS. 16A and 16B.

FIG. 16D is a perspective view showing the recirculation pump without the housing.

FIG. 16E is another view of the recirculation pump.

BEST MODE FOR CARRYING OUT THE INVENTION

FIGS. 1-15 show a first embodiment of the present invention, directed toward a sous vide water/liquid cooking appliance using a conventional sink, in particular, a kitchen sink. Kitchen sinks are typically made with a variety of materials designed to hold hot water for general domestic cleaning purposes. Water is released through a drain system. Such kitchen sinks are made in a variety of shapes. A kitchen sink is typically in a fixed location in a kitchen and occupies a significant amount of space, with many modern kitchens having more than one sink separated from each other or a double sink.

Figure 1:
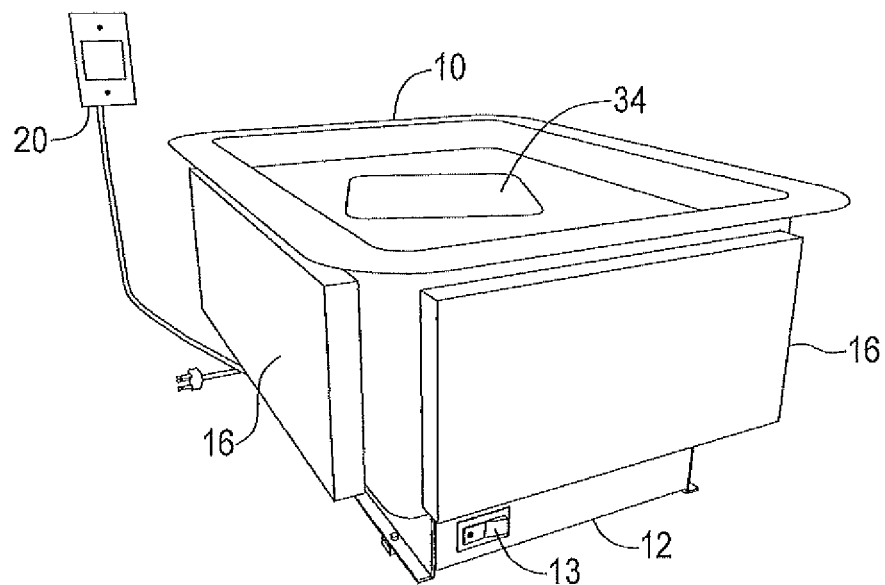
FIG. 1 is a perspective view of a sous vide appliance using a convention kitchen sink.
Figure 2:
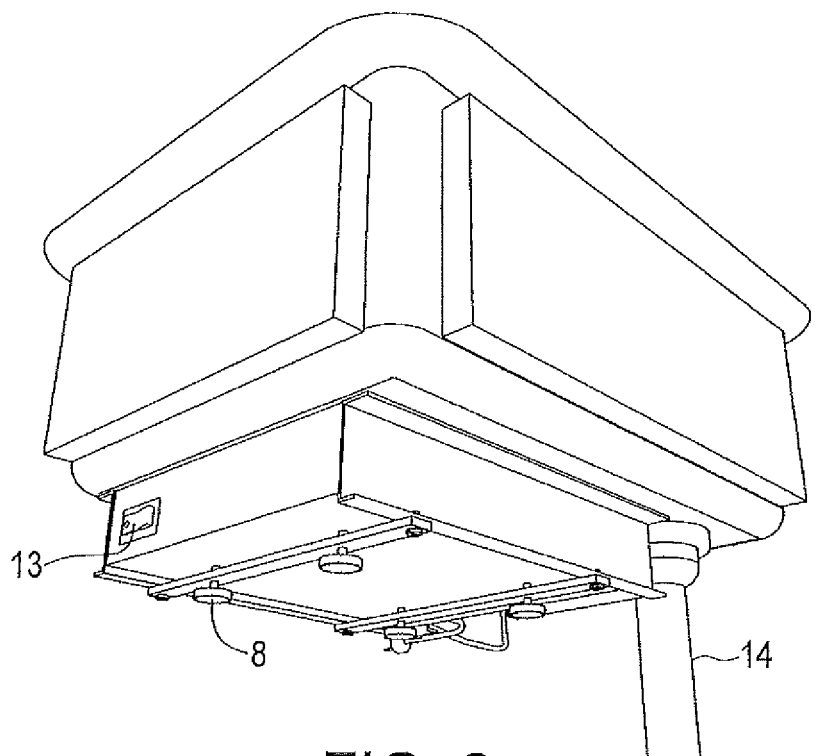
FIG. 2 is a bottom perspective view of the appliance of FIG. 1.

The present invention uses the conventional kitchen sink as a primary cooking bath. A sink is shown generally at 10 with a heating unit 12 connected to the bottom of the sink, controlled by an on-off switch 13. The sink has a conventional drain 14. The heating unit 12 as shown is an induction-style unit. While various types of heating elements can be used, if the sink is made of stainless steel or cast iron, the induction unit will be sufficient for heat transfer to the water bath within the sink. Insulating materials 16 can surround the sink. Wired temperature sensors 18 are positioned to provide temperature feedback information to an electronic controller 20. The controller would typically be incorporated into the induction heating unit 12, although it could also be located separately, as shown in FIG. 1, Wireless sensors could also be used in place of the wired sensors 18. An advantage of the wireless sensors is that they can be placed inside the food bag to monitor the temperature close to the food or the core temperature of the food, using a probe-style sensor. If a wired sensor were used to measure the core temperature of the food, the resulting hole in the food bag would typically be sealed with a waterproof adhesive tape of the like.

Figure 3:
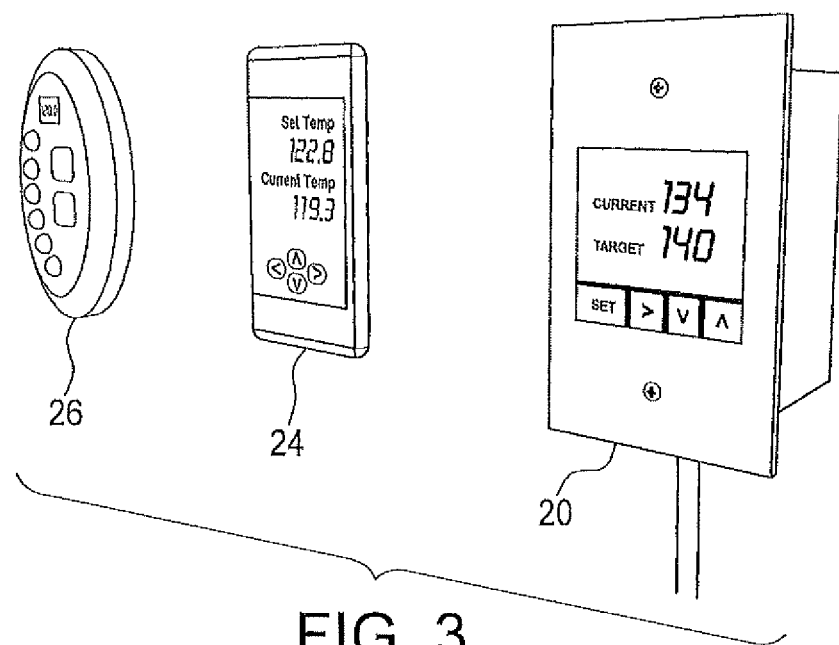
FIG. 3 is perspective views of various control units for the system of FIGS. 1 and 2.
Figure 4:
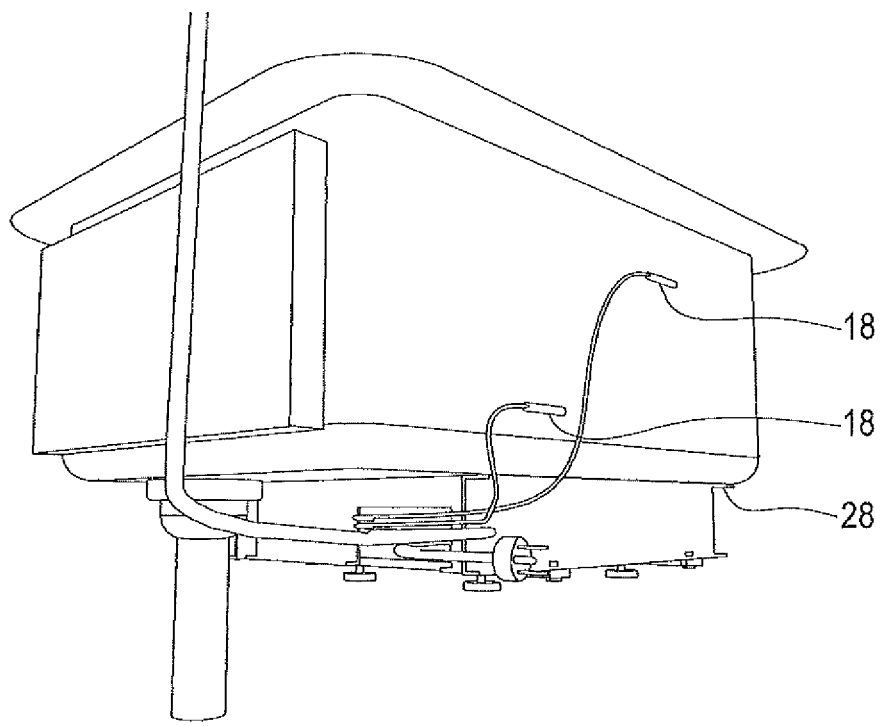
FIG. 4 is a perspective view of a sous vide kitchen sink appliance using wired sensors.

Possible controls for the system, such as shown in FIG. 3, can include a wireless remote unit 24 and a smart phone 26. It should be understood that other electronic displays could be used to monitor the cooking process in the water bath. Smart phones, tablets, pads or computers can be used with various wireless techniques, such as a Bluetooth range WiFi or information can be sent to the internet for monitoring as well, including wired connections or cellular data.

Figure 5:
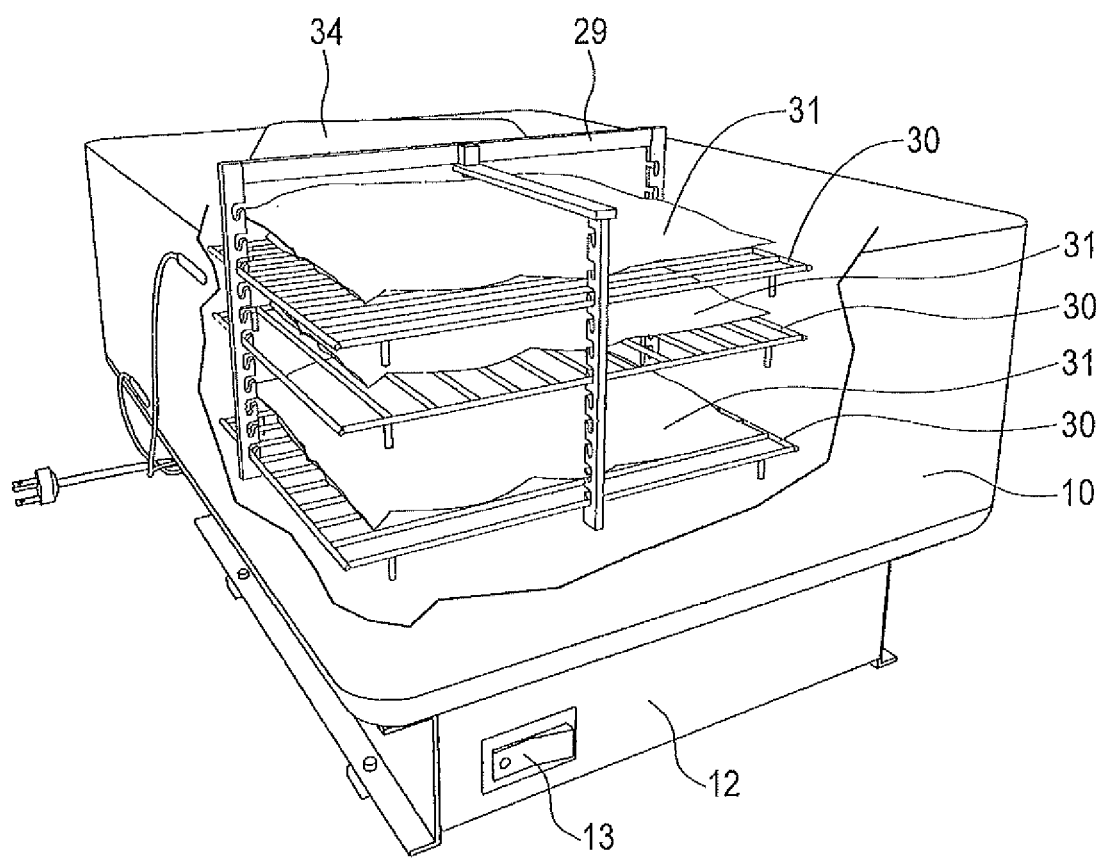
FIG. 5 is a perspective view showing the use of a sous vide appliance using multiple cooking racks.

A bracket 28 for supporting the heating unit can be attached to the sink such as by welding in a factory installation or, when attached to an existing sink, high-temperature epoxy or adhesives can be used. It is important that the heating unit be designed to be installed without the need to disturb existing plumbing connections, for ease of installation, FIG. 5 shows a cooking rack frame 29 having three separate cooking racks 30-30 for supporting individual cooking bags 31-31, each of which is supported on a separate rack. The cooking rack frame 29 is adjustable and can be raised and lowered conveniently by the user, either in or out of the water/liquid bath.

Typically, but not necessarily, the sink water/liquid bath will include a floating warning member 34 which provides a warning that the sink water is hot to the touch. Also, it should be understood that pads can be used to cover the entire sink for protection or for insulation (not shown). Additionally, other methods of insulation include the use of floating balls or other objects on the surface of the water/ liquid. The sink may also have a retractable lid which is secured to the sink in some manner but can be moved out of the way to expose the sink opening, without separating the lid from the sink.

FIGS. 6-15 show embodiments which include multiple cooking temperature zones.

Figure 6:
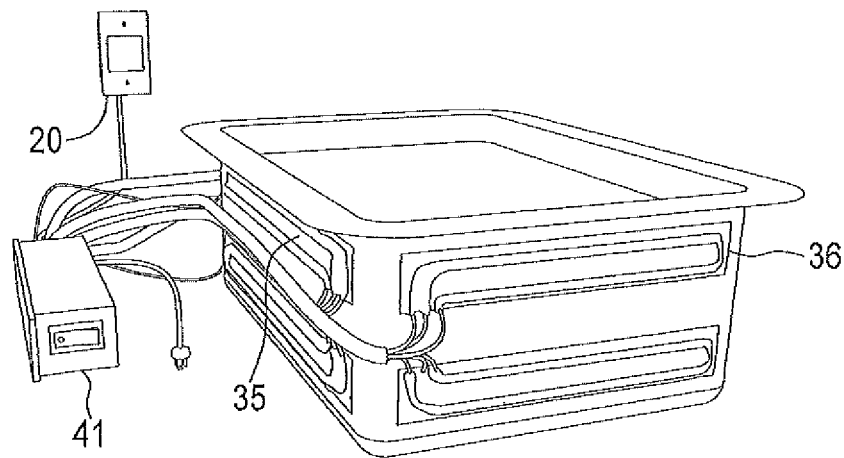
FIG. 6 is a perspective view of a sous vide appliance having multiple cooking zones.
Figure 7:
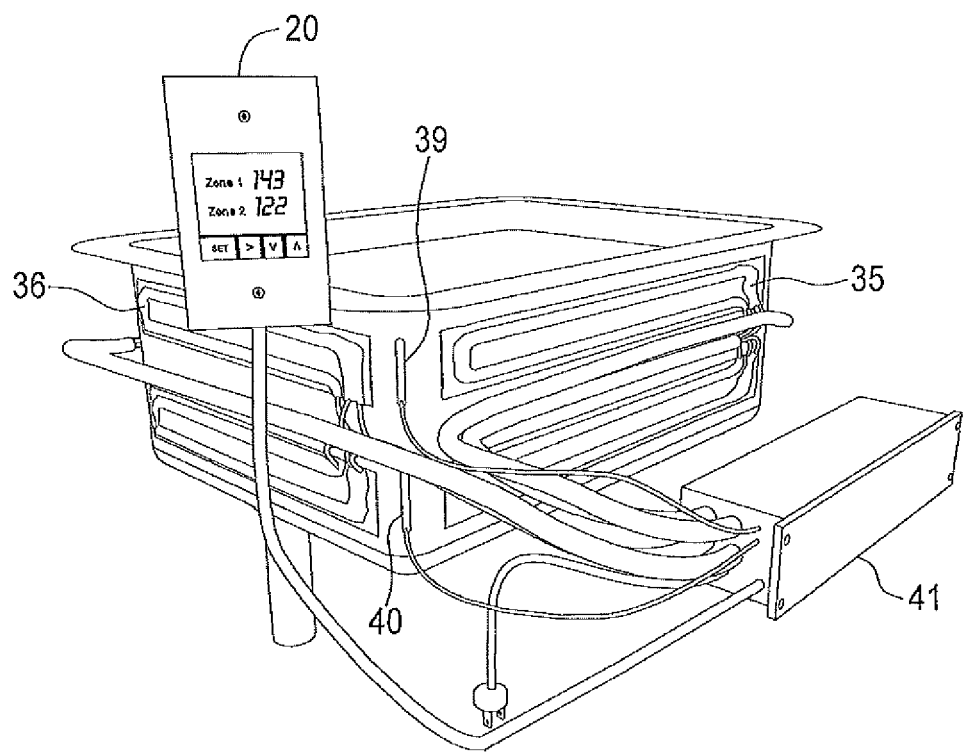
FIG. 7 shows a sous vide appliance having two heating zone, one above the other.
Figure 8:
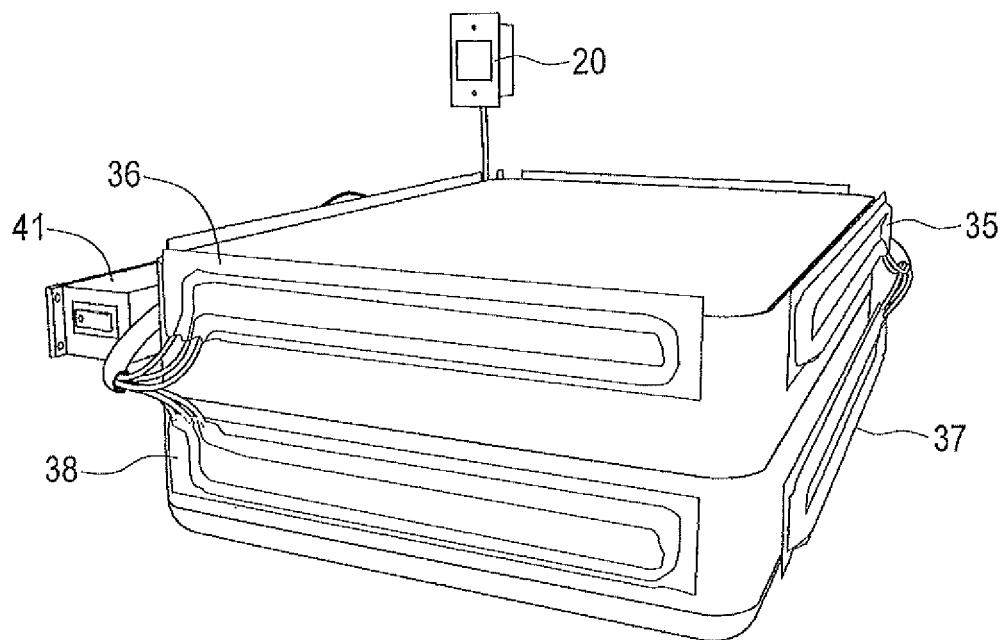
FIG. 8 is a perspective view showing the attachment of heating units to the appliance of FIG. 7.

FIG. 6-8 shows the water bath arranged to maintain two heating zones (upper and lower), so that multiple food items can be heated separately in each zone or single food items could be heated in two zones at the same time. In FIGS. 7 and 8, multiple heating elements are attached to the sides of the sink. Heating elements 35 and 36 are attached to the upper portion of the sink while heating elements 37 and 38 attached to the lower sides of the sink. Temperature sensors 39 and 40 monitor the temperature in each heating zone. Controller 41 monitors the temperature of each zone and turns on or off the individual heating elements to maintain the target heating temperature in each of the zones. FIGS. 7-8 show the two zones vertically. For example, the upper zone shown in FIG. 8 might be heated to a temperature of 143° F., suitable for beef, while the lower zone could be maintained at a temperature of 122° F., appropriate for fish. FIGS. 7-8 shows the two temperature zones being stacked or on top of each other, with equal vertical dimensions, although the vertical dimensions of the two zones need not be equal. One or both of the zones could be used for cooling as well, using cooling elements, such as Peltier thermoelectric modules.

Figure 9:
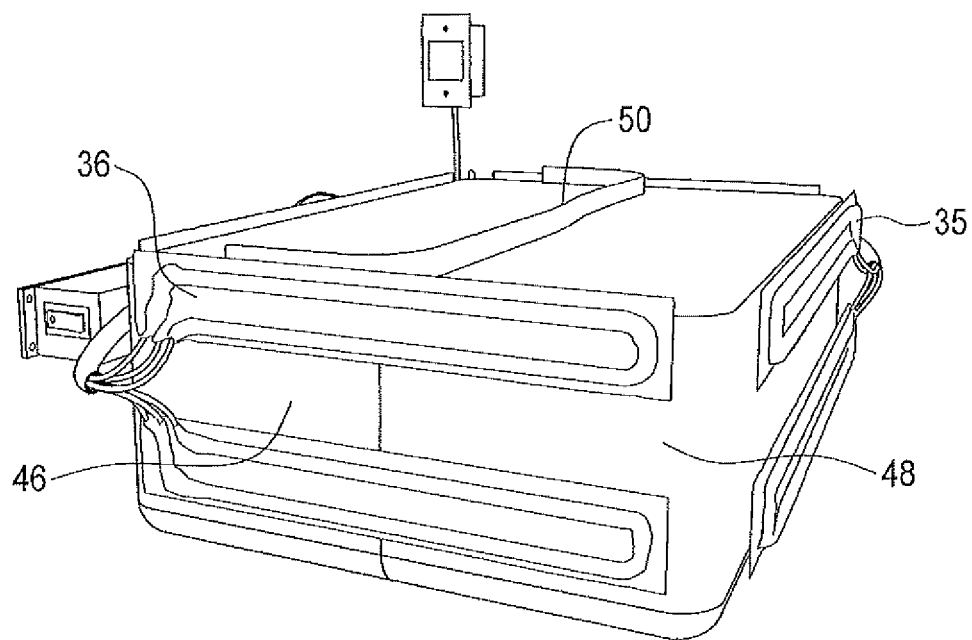
FIG. 9 is a perspective view of a sous vide appliance having two zones arranged side by side.

FIG. 9 shows two zones arranged side by side indicated at 46 and 48. A temperature isolation baffle as shown vertical at 50 will maintain the temperature isolation between zones 46 and 48. The isolation baffle 50 is held in position by suction cups, magnets or other elements, Baffle 50 could be cut to match the internal contour of the sink and placed in a position to be self-supporting. The isolation baffle could be either rigid or flexible. One example is Neoprene. The position of the isolation baffle could be adjusted to accommodate the size of food items to be cooked. The two side by side zones shown at 46 and 48 could further be controlled by upper and lower heating elements on each side referenced at 39 and 41, thereby providing a total of four different zones.

In operation, all of the heating elements can be used to bring the different zones up to the lowest target temperature. From the lowest target temperature of both zones, the controller will use the side heating zones to bring the zone up to the final temperature of that zone and maintain it. Some of the zones could be cooling as well.

Figure 10:
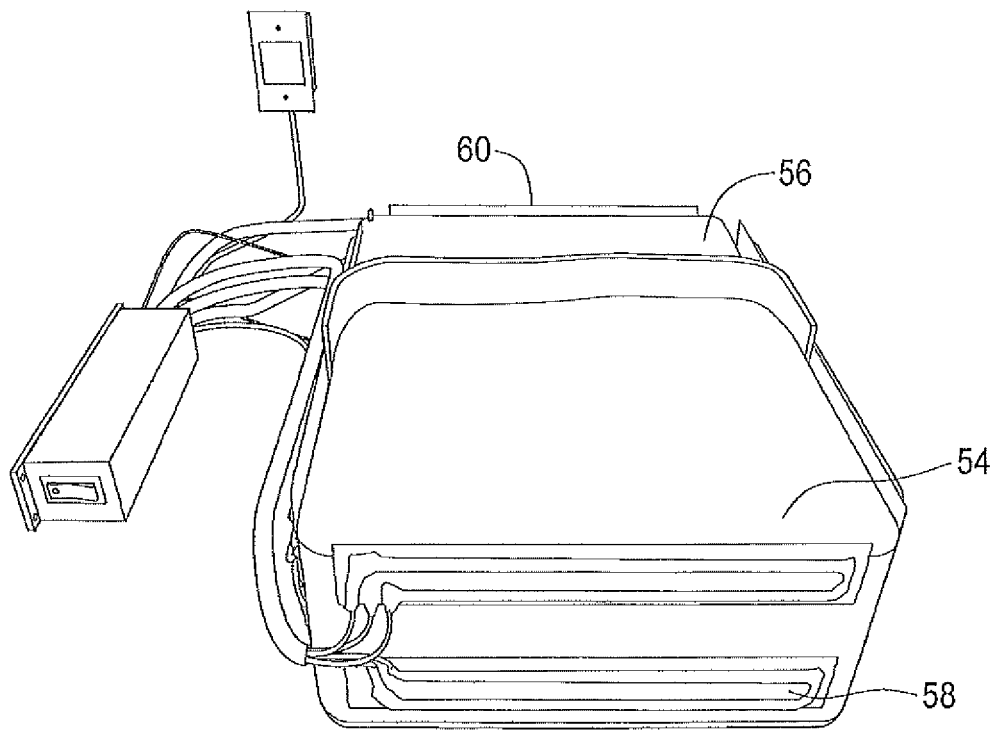
FIG. 10 is a perspective view showing a sous vide appliance having two zones front to back and two upper and lower zones.

FIG. 10 shows a different orientation, with the two zones 54 and 56 being positioned front to back and two additional upper and lower zones 58, 60 for a total of four zones.

The heating elements for these various embodiments are typically electric load style, encased in a Mylar foil for ease of application. The heating elements may be applied directly to the sink as shown or incorporated during manufacture. Other heating systems can also be used, including induction heating elements or lasers or other means. As indicated above, the temperature sensors can be positioned within the heating zones, using wired or wireless sensors, in any combination. The temperature sensors may also be positioned outside the sink and programmed or adjusted to provide an accurate temperature of the water/fluid inside the sink.

Figure 11:
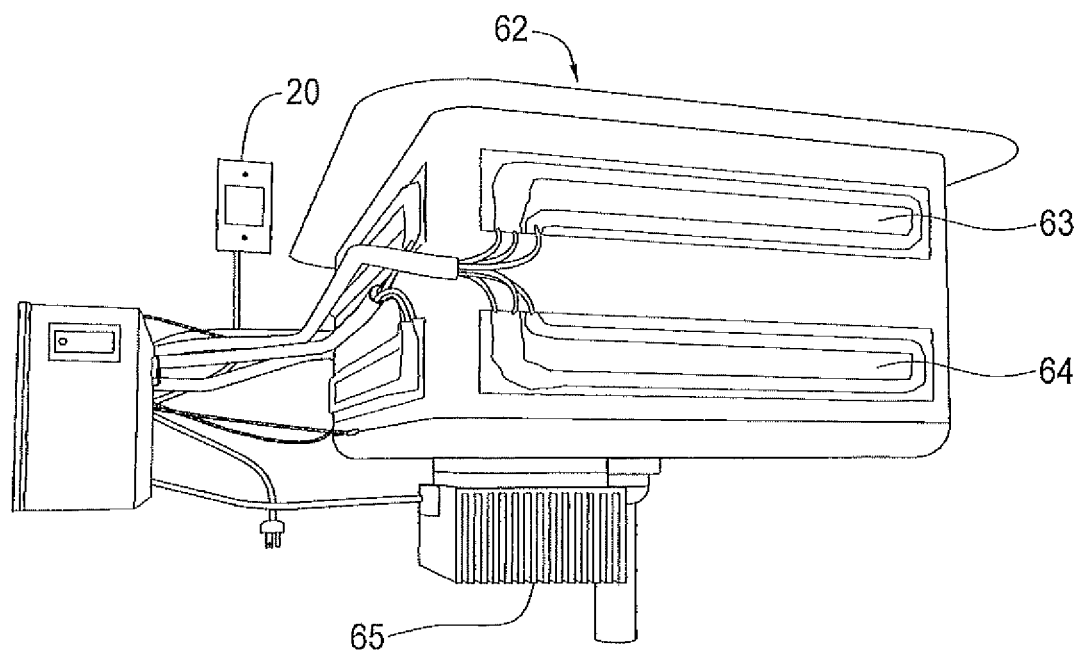
FIG. 11 is a perspective view showing a sous vide appliance with three temperature zones.

FIG. 11 shows a three-temperature zone embodiment, one on top of another. The system, referred to generally at 62, has three heating zones vertically. Heating units 63 and 64 are used for the upper two zones while the lower zone uses a Peltier thermoelectric heating and cooling module 65. In some applications, the units 63 and 64 could be replaced by Peltier thermoelectric heating and cooling modules of other heating/cooling systems to provide a greater range of temperatures in each zone. The module 65 can become either a heating or cooling module, depending upon the power supplied to the module. When the cooling unit 65 is used alone, the water bath can be used to chill food as well as drinks. Safe food handling practices include the use of an ice or chilling bath after the food is cooked to quickly reduce the temperature of the food before storing it in a refrigerator or freezer. While this is common practice in commercial food handling, it is often overlooked in the home kitchen. In the present system, the hot water/liquid is easily drained from the sink and replaced with cold water. The chilling cycle is turned on, eliminating the need for adding ice. Chilling may also be accomplished with a variety of options, including conventional compressors and refrigeration systems. Chilled gel or other cooling packs or containers may also be positioned inside or outside of the sink for cooling.

Further, prior to the water bath being heated to a target temperature, a food item may be held at a safe cool temperature. At a scheduled time, the cooling bath can be turned off and the heating process begun. The use of a cooling module increases the range of possible temperature targets. The cooling module 65 at the bottom of the sink with heating elements at the upper side of the sink creates a natural convergence zone of the water temperature gradient.

Figure 12:
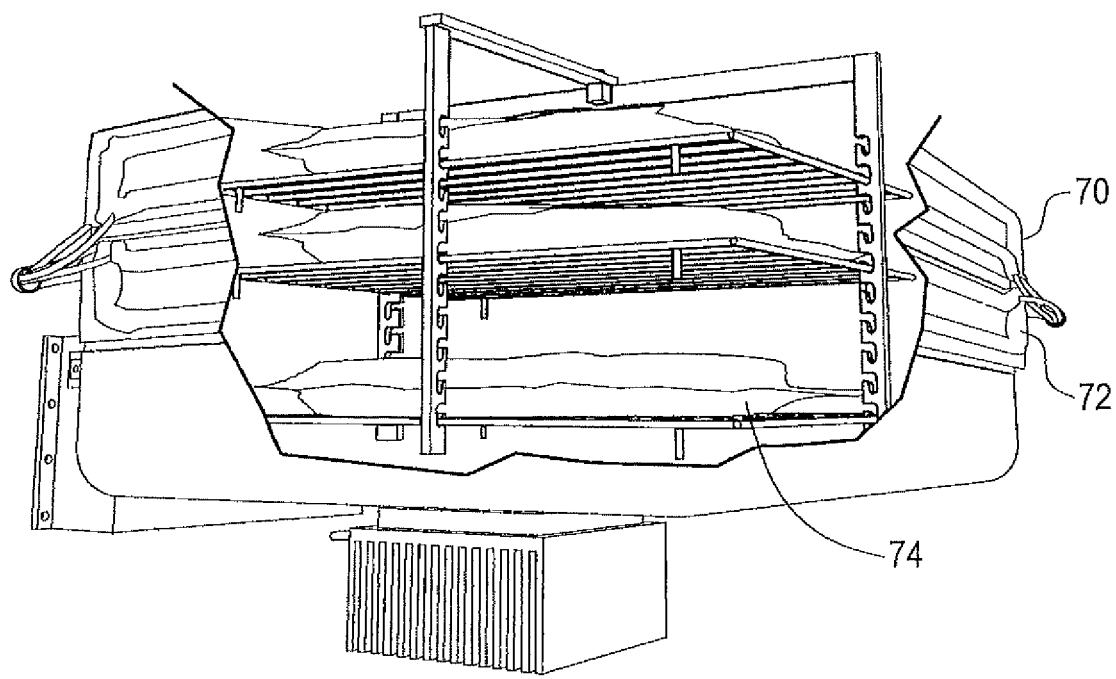
FIG. 12 shows a sous vide appliance with individual food items in different zones.

Each zone may be targeted and displayed separately for monitoring. FIG. 12 shows individual food items. As one example, beef steaks in upper zone 70 could be set for well done at 160° F., intermediate zone 72 for medium at 140° and lower zone 74 for 120° for rare. In sous vide cooking, the target temperature of the water bath is typically set at 1° or 2° higher than the final food serving temperature desired. If a probe is positioned in the food item, then the target temperature is set to the final serving temperature. Temperature monitoring may be accomplished using a single sensor or combination of sensors, positioned within the sink or outside the sink. Various temperature sensing technologies, including infrared, may be used. After the desired cooking time and temperature is achieved, the food may continue to be held at the proper temperature until it is served.

Another common problem is keeping dish water hot enough over a period of time to properly clean dishes in the sink. The present system will maintain water at the desired temperature as long as needed, eliminating the need to drain the cooled dish water and replace it again with hot water from the tap.

Figure 13:
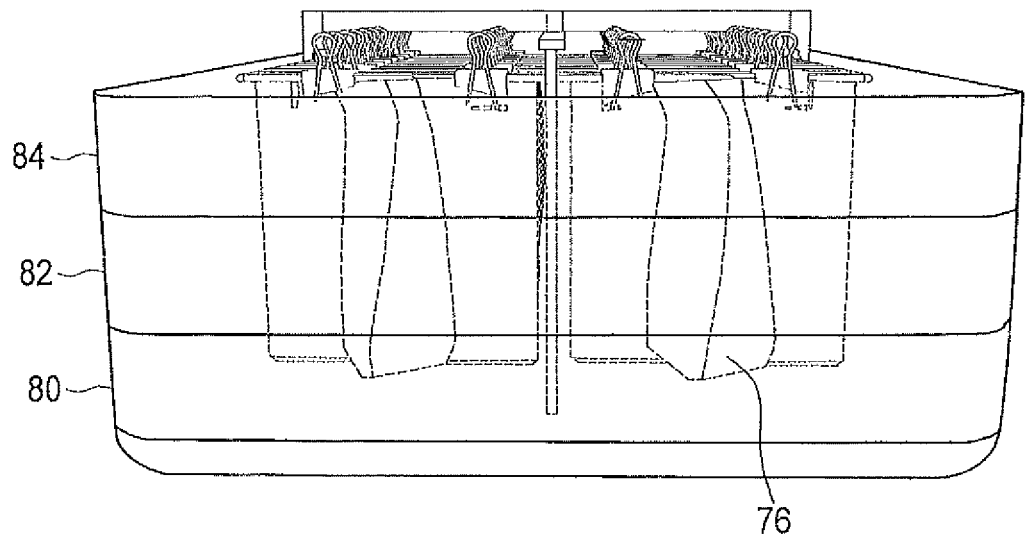
FIG. 13 is a perspective view of a sous vide appliance showing cooking items with multiple temperature zones.
Figure 14:
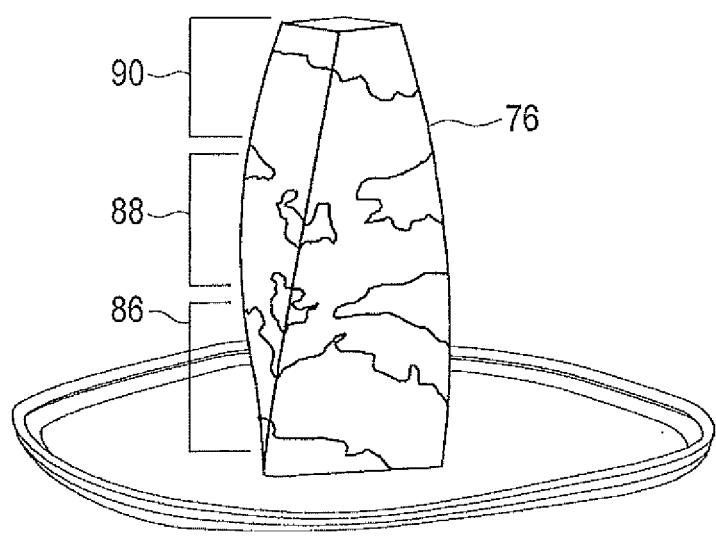
FIG. 14 is a front elevational view of an item having three zones with different temperatures.

Multi-temperature items can be accommodated readily with the two or three-layer system. FIG. 13, for instance, shows a single food item 76 with a wide range of temperatures, textures and flavors, such as for instance, a hot fudge sundae. One possibility would be using three zones 80, 82, 84, such as shown in FIG. 14, where the bottom layer 86 of the sundae could be cold, frosty or frozen, while the middle layer 88 could be warm, soft and smooth and the top layer 90 hot or silky. While a multi-temperature zone system is shown here with two or three zones, the number of zones may be increased as required by various specific cooking techniques. The size of the zones may be increased as well.

Figure 15A:
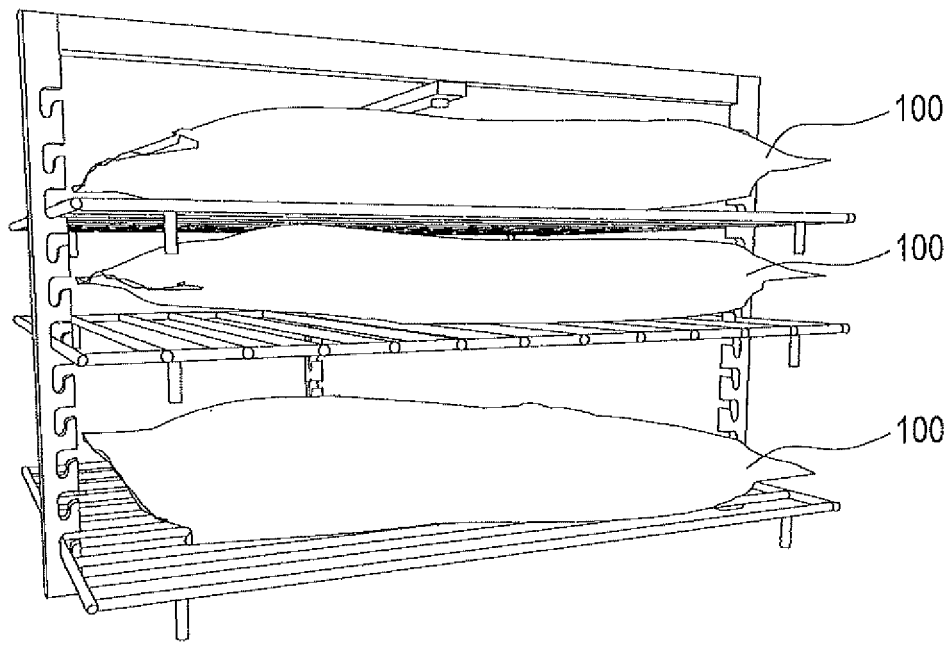
FIG. 15A is a perspective view showing cooking bags in a horizontal position.
Figure 15B:
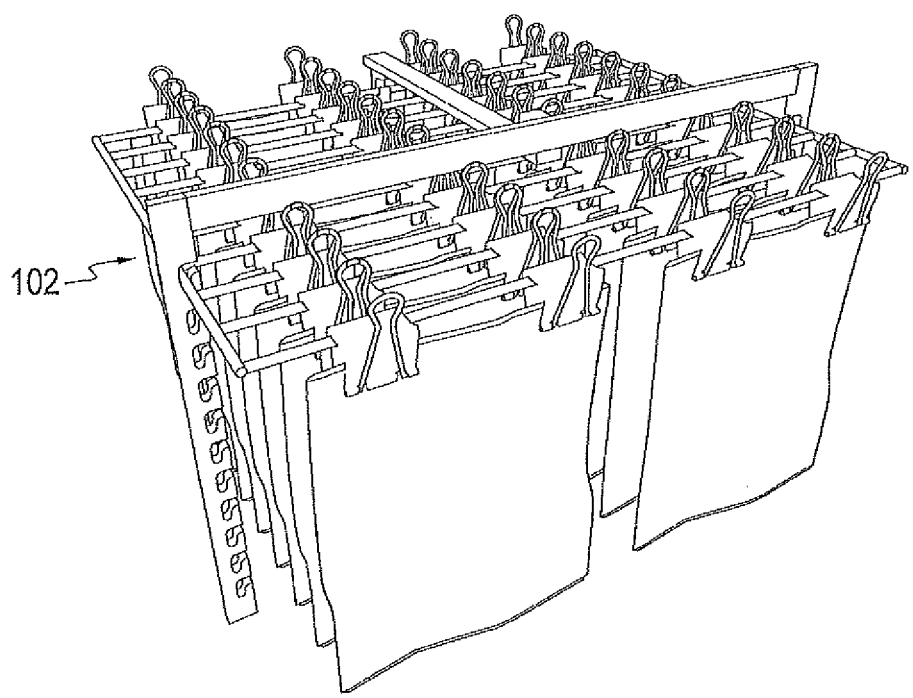
FIG. 15B shows cooking bags in a vertical position.
Figure 15C:
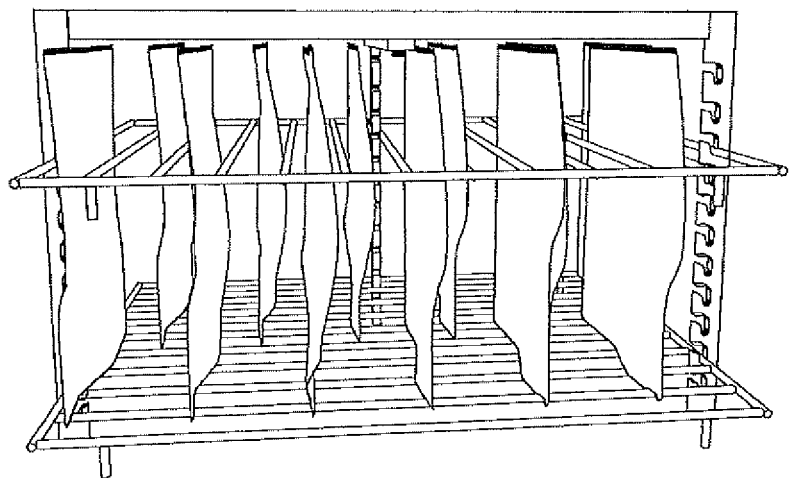
FIG. 15C shows food bags in a vertical position held in position by racks.
Figure 15D:
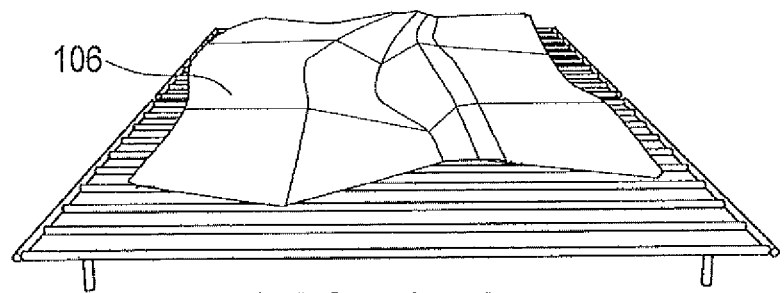
FIG. 15D is a perspective view showing the position of large food items on a rack.
Figure 15E:
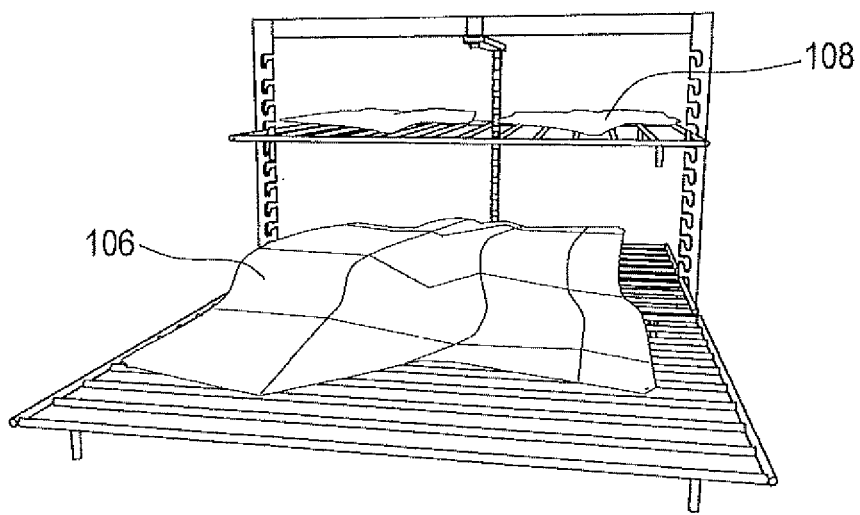
FIG. 15E is a perspective view showing another arrangement of large food items on multiple racks.

The potential cooking racks designed to hold in position food in bags are shown in FIGS. 15a-15e. Food in bags 100 may be positioned both horizontally, as shown in FIG. 15a, or vertically, as shown in FIG. 15b, to accommodate various cooking techniques with multiple-zone configurations. For instance, the entire food rack 102 can be loaded with food outside of the water bath and then positioned in the water bath fully loaded. FIGS. 15b-15c show arrangements where the food bags are positioned vertically, held by clips or held in position in racks, while FIGS. 15d and 15e show arrangements by which large food items 106 can be cooked either individually or with smaller items 108, demonstrating the versatility of the present system.

FIGS. 16a-16e show a recirculation pump 110 which is useful when the water bath is to be maintained at a uniform temperature throughout a heating zone. The pump is positioned in either a vertical or horizontal orientation, provided that the water intake opening 112 is below the water level. Magnet 114 on the bottom of the pump attaches the pump to a stainless steel or cast iron sink. Otherwise, suction cups or other attachment elements can be used. Pump 66 may include a battery 116 and a charging port 118 for the battery. An on/off switch 120 is shown in FIG. 20B. The pump moves water to the outlet ports 124. It is preferable that ports 124 be arranged around the circumference of the pump and at different heights. The pump 110 produces an even water distribution, resulting in a more even temperature zone. In operation, water is moved passed the intake separator 126, then flows between the battery case housing 130 and the outer case housing 132.

Figure 17:
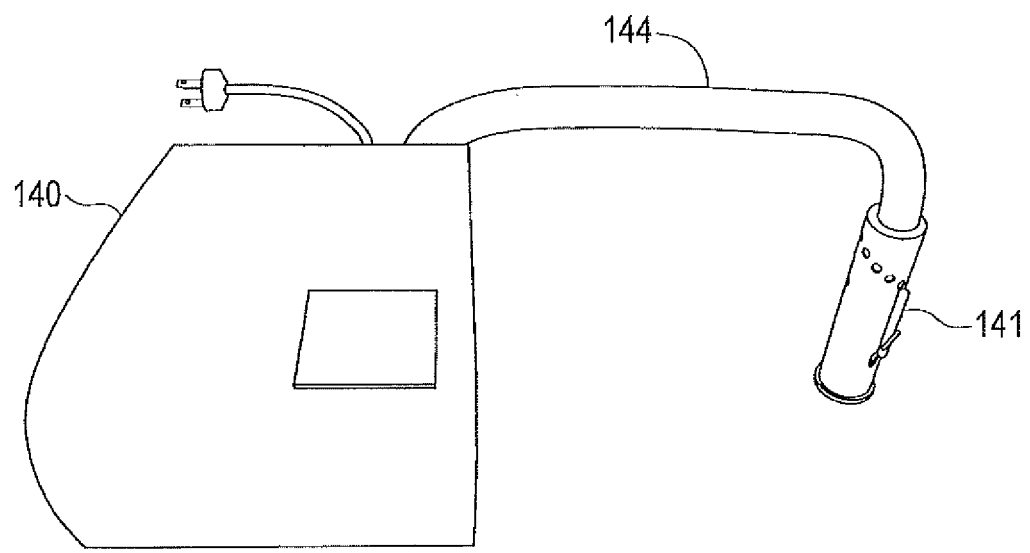
FIG. 17 is perspective view of a heating unit for a sous vide liquid container.
Figure 25:
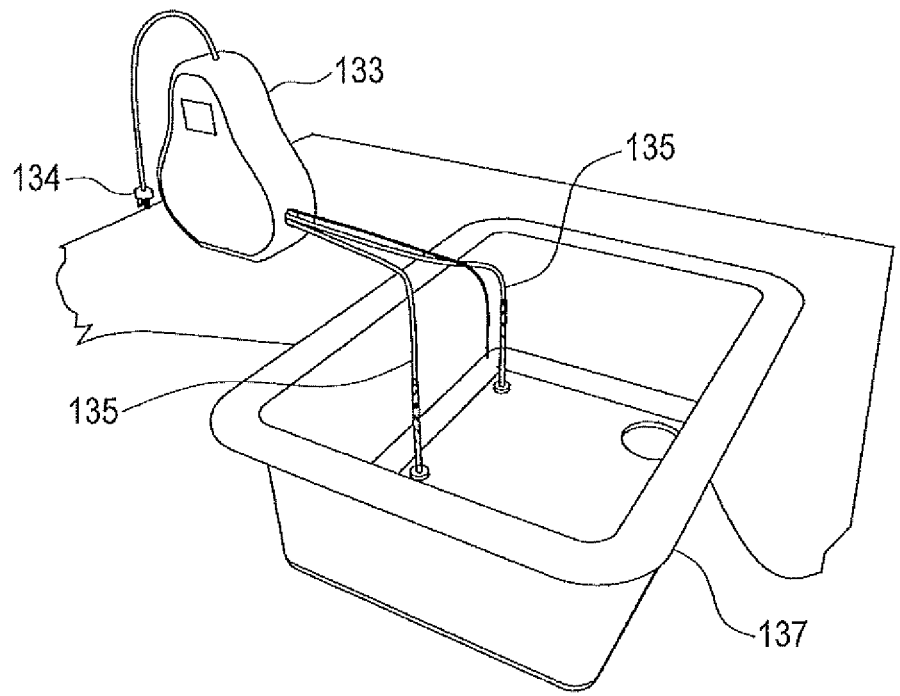
FIG. 25 is a perspective view of another embodiment of a sous vide kitchen sink appliance.

FIG. 25 shows an alternative embodiment to the embodiments of FIGS. 1:15. FIG. 17 includes an integrated heater control assembly 133, with a plug 134 which in use is connected to the source of power. Extending from the heater control unit, which is in the modern shape of a pear, the water distribution lines are shown at 134 and 135. They are attached via magnetic bases 135 and 136 to the sink 137. A temperature sensor 138 extends from the heater/control unit.

Figure 18:
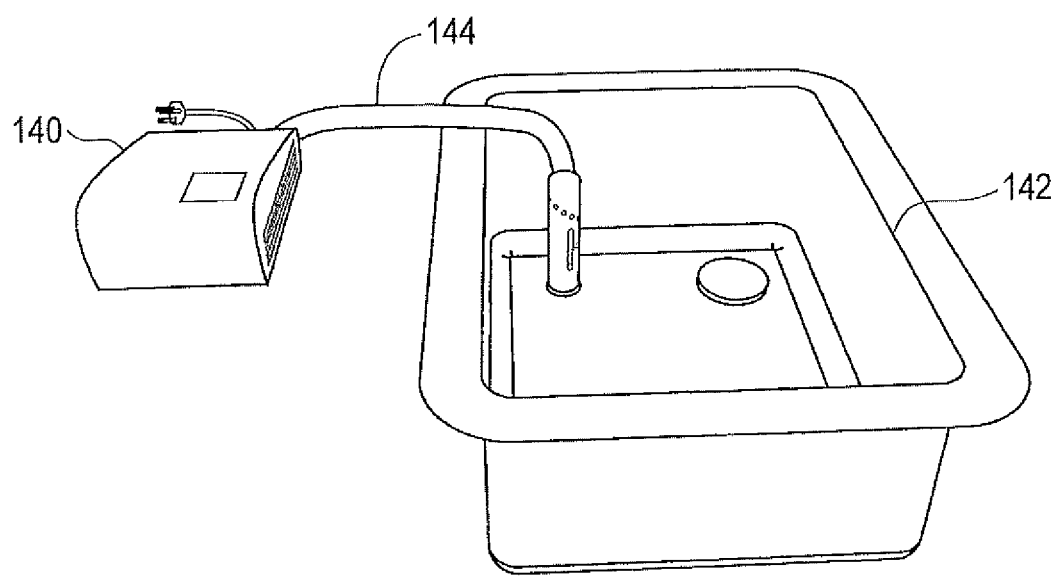
FIG. 18 is a perspective view showing the heater of FIG. 17 used with a sink.
Figure 19:
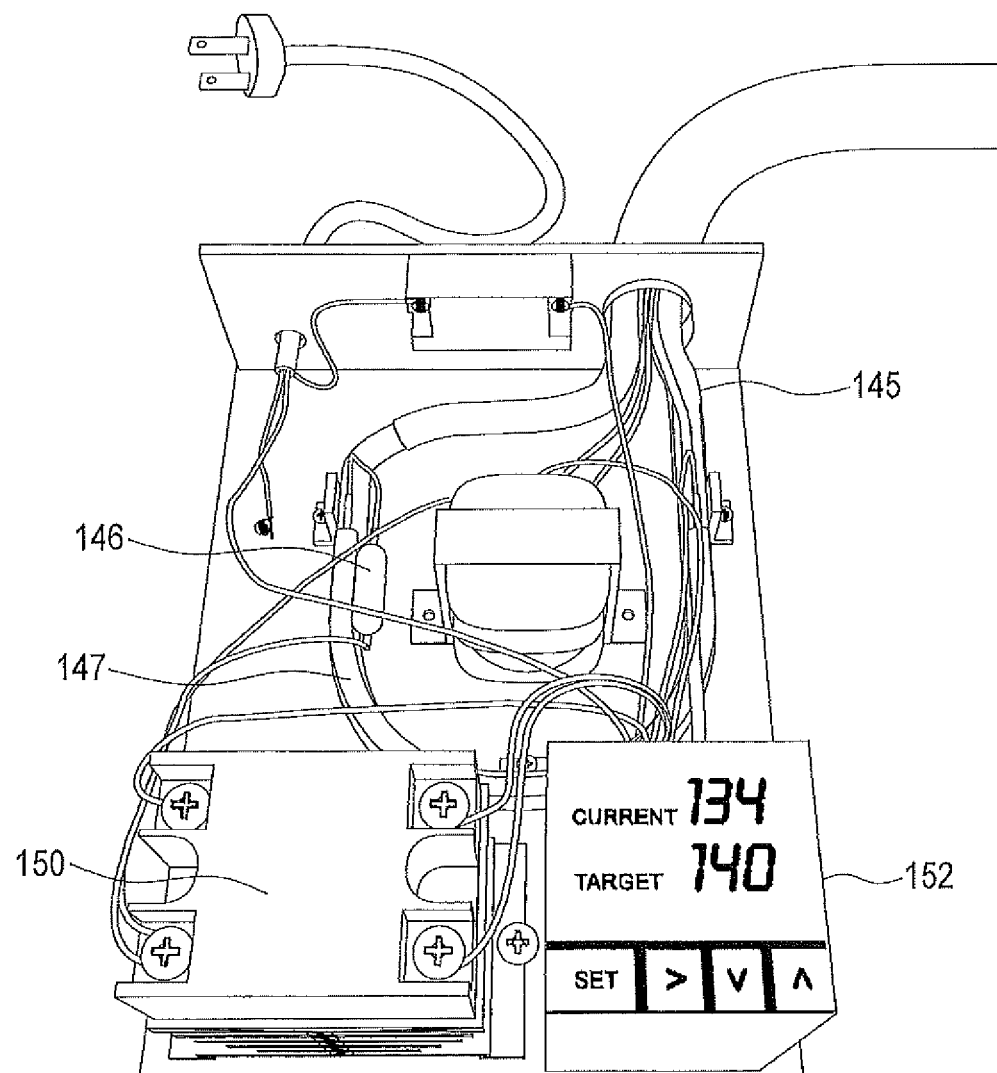
FIG. 19 is a perspective view showing a complete sous vide control system for the embodiments of FIGS. 17 and 18.

A portable heating unit for a sink or other container is shown in FIGS. 17-19. The portable heating unit can be used with any sink 142 (FIG. 18) as an alternative to permanently attaching a heating unit to the sink, as shown in FIGS. 1-15. This embodiment includes a heating and control unit 140 and a water exchange unit 141. A flexible hose or similar member 144 connects unit 140 with unit 142. In FIG. 19, water from the hot water bath is typically pumped through an inlet line 145 and through or by a heating element 147 and then returns to the hot water bath. A thermo fuse 146 is shown for protection. A solid-state relay 150 operates the heating unit and the pump, and the controller 152.

Figure 20:
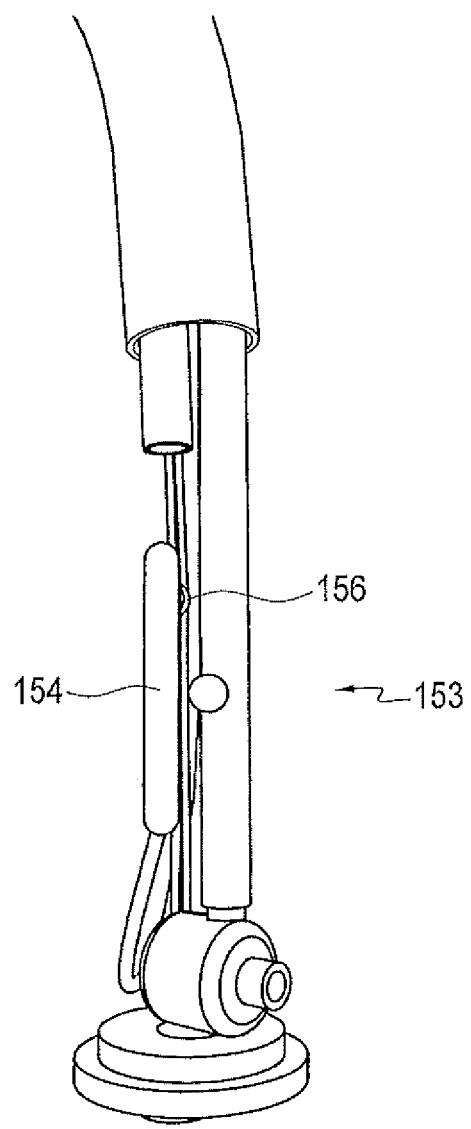
FIG. 20 is an elevational view of the submersible pump for the embodiment of FIGS. 17-19.

The water exchange system is shown in FIG. 20, using a submersible pump 153. A temperature sensor probe 154 is attachable by means of a magnet 156. The portable heating unit can be readily moved from sink to sink or location to location. In some situations the system may use a self-priming pump or pumps in place of, or in combination with the submersible pump or pumps 153 to allow greater flexibility in placement and size of the pump, such as in the housing 140 (FIG. 17). The pump could also be controlled independently of the solid-state relay 150 to provide continuous circulation. A self-priming pump may tend to be louder during operation than a submersible style pump that is not self-priming. In some situations where a quieter operation is desirable, a submersible pump could be in the housing 140 (FIG. 17) used for circulation in combination with a self-priming pump to lift the water to the housing. While a single flexible hose housing 144 is shown containing both the hot water outflow and cold water return tubes, in some cases the tubing could be separate and independently positioned for certain cooking requirements. The hot water output and the cold water return may be positioned with a variety of attachments or distribution devices. For example, tubing may be part of a cooking rack which would be suitable for very shallow water cooking such as for bain-marie style custards or crème brulee. For larger containers, more than one water distribution port may be used, as well as multiple water return ports. Likewise the location of temperature sensor probes could be positioned as desired.

Figure 26:
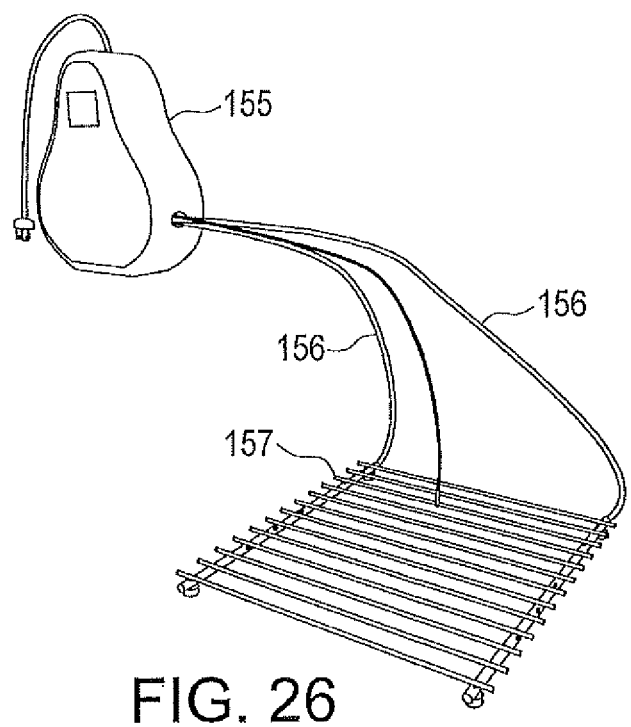
FIG. 26 is a perspective view of a heating/cooling unit in combination with a tube/cooking rack arrangement for a sous vide appliance.
Figure 27:
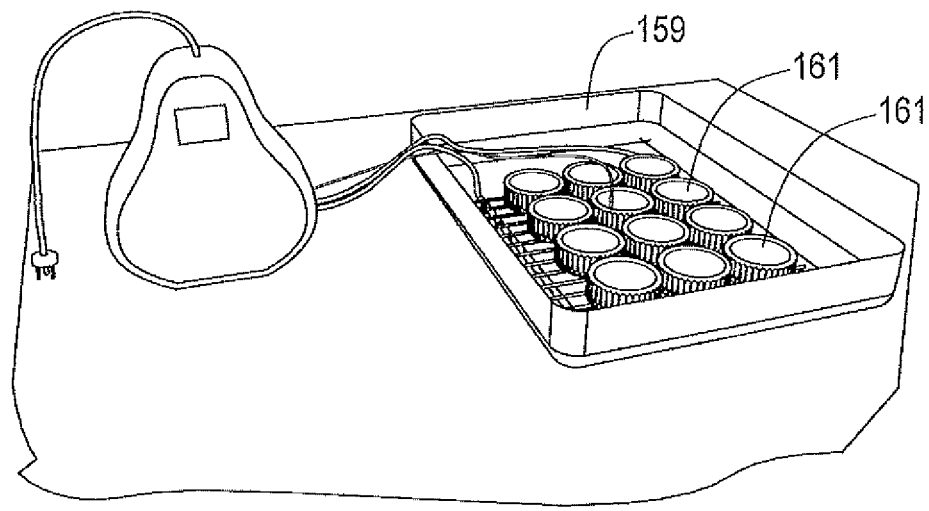
FIG. 27 is a perspective view of a "bain-marie" appliance.

FIG. 26 shows an example of a heating unit 155 where the water is circulated through tubes 156 which are part of a cooking rack 157. FIG. 27 shows a similar arrangement with a shallow tray 159, holding a plurality of custard cups 161 for bain-marie cooking.

Figure 29:
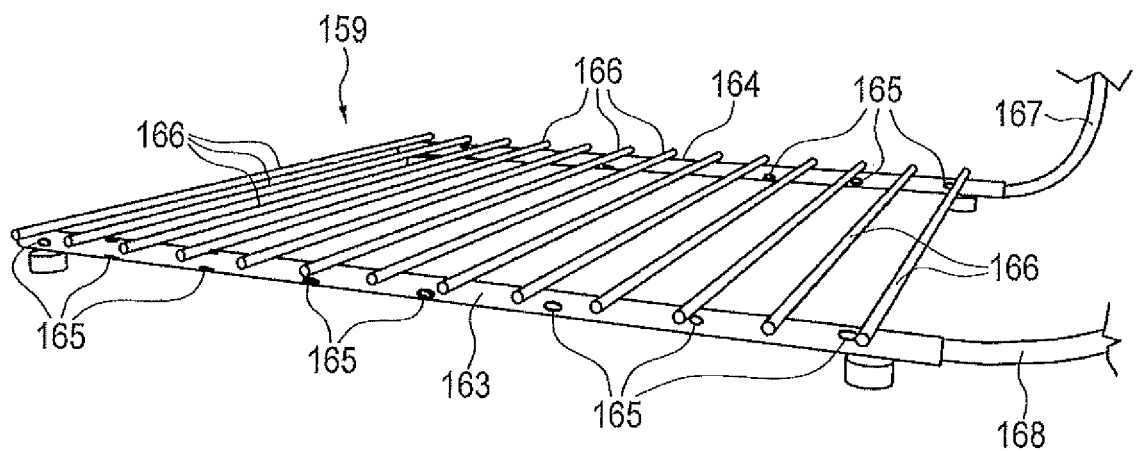
FIG. 29 is a perspective view of a cooking rack with integrated water connections.

A cooking rack accessory is shown in FIG. 29, generally at 159. It includes spaced hollow water tubes 163, 164, with openings 165 spaced therealong. Solid rack bars 166 are attached to the tubes 163, 164 along the lengths thereof. Flexible water tubes 167, 168 connect to one end of the tubes 163, 164 and extend out of the sink to a heating/control unit. Such a cooking rack can be used for both shallow cooking trays and conventional sink depths. The sink may have liquid-tight openings to which flexible water tubes and the hollow water tubes may be attached. Such an arrangement can be used for the typical sink embodiment described above.

Figure 21:
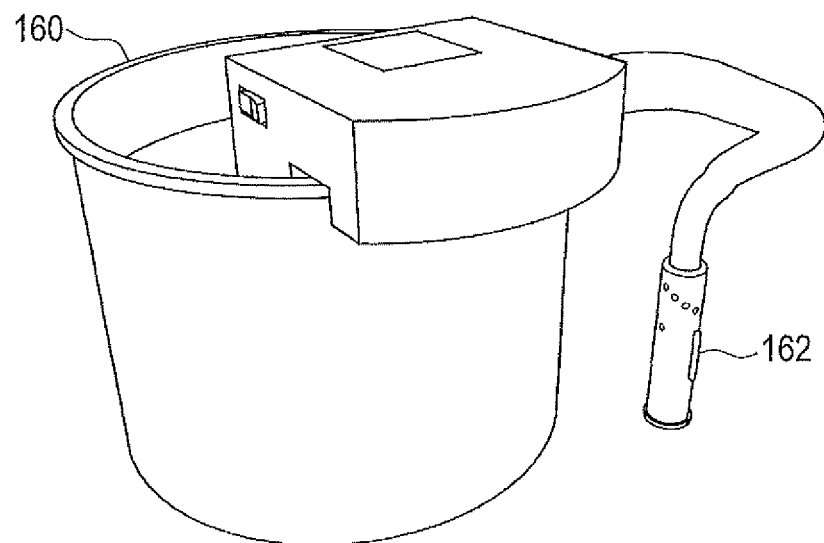
FIG. 21 is a perspective view showing a heater element with a portable liquid container.
Figure 22:
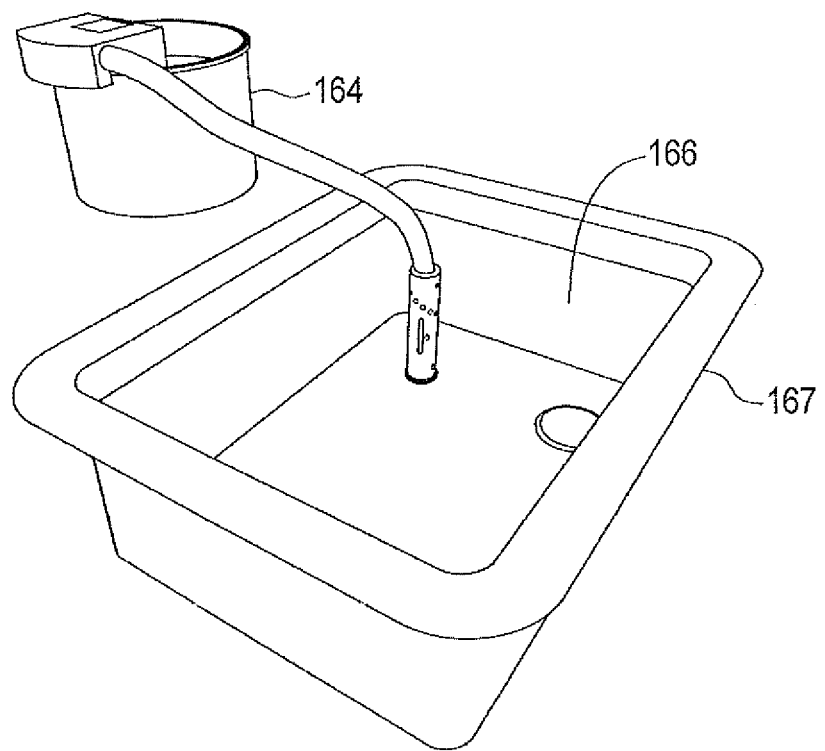
FIG. 22 is a perspective view showing a portable control system attached to a sink.

Still referring to a portable water control system, FIG. 21 includes a hot water container 160. The sensor 162 shown in FIG. 21 is used to maintain the correct level of water in the heating source. In one configuration, a pump is used, where the cold water is returned to a heating source and then passed through a heat exchanger and returned to the hot water bath 166. A temperature probe is contained in unit 162.

This portable control system can be configured or attachable to a sink 167 or another container. The control system could also be designed into a typical dedicated single purpose appliance such as a coffee maker to create a multi-use appliance. When the appliance is in the sous vide mode, the control system could use a shared water heating system, where the hot water would be transferred to a sink or container, and the cold water returned for heating. The hot water output tubes and cold water return could be detached with quick disconnect fittings when returned to the coffee mode. By turning a typical single purpose appliance into dual (or more) purpose appliance, counter space is saved and a cost savings may be realized as a result of the shared components. Conventional rice cookers, steamers or pressure cookers could also be utilized with this system.

Figure 28:
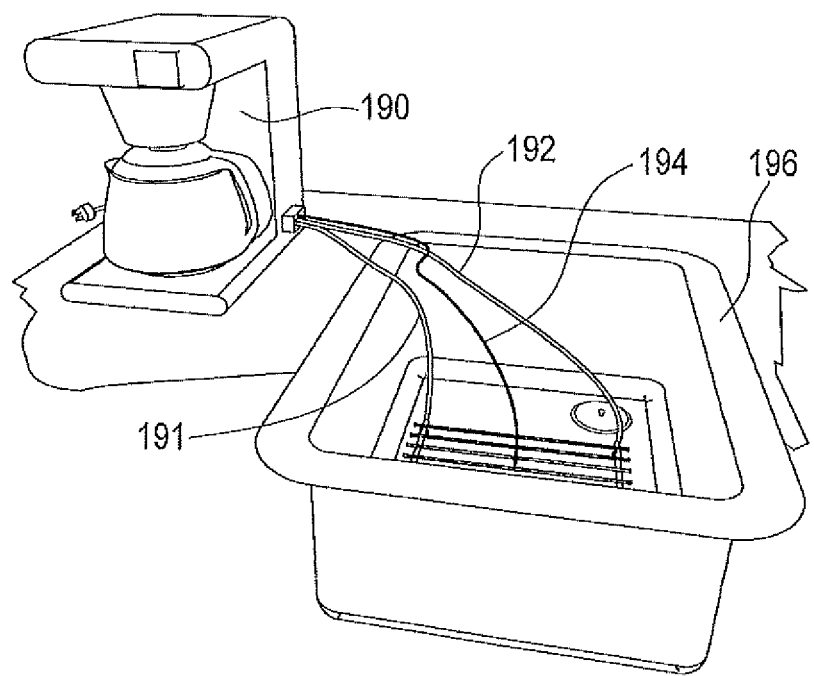
FIG. 28 is a perspective view of a coffeemaker appliance which can be used as a sous vide appliance.

Such an appliance is shown in FIG. 28. In this example, a coffeemaker 190 in one mode is a conventional coffeemaker. It also includes hot water output tube 190 and cold water return 192, which have quick disconnect fittings to the coffeemaker. Also included is a temperature sensor 194, In the arrangement of FIG. 28, a conventional sink 196 is used when the appliance is in the sous vide mode.

Figure 23:
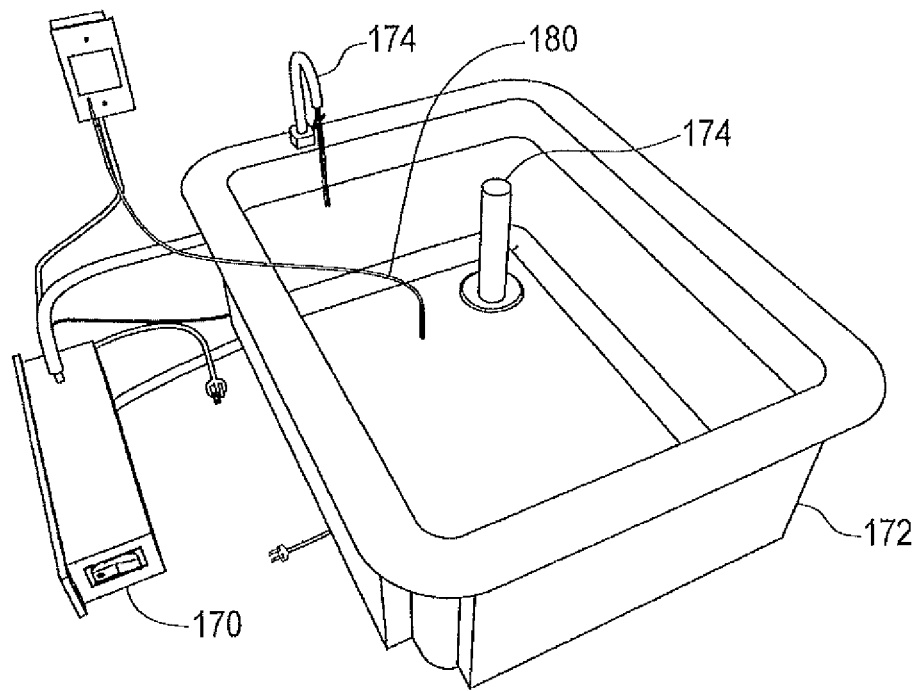
FIG. 23 is a perspective view showing a hot water dispenser used with a kitchen sink as a sous vide appliance.
Figure 24:
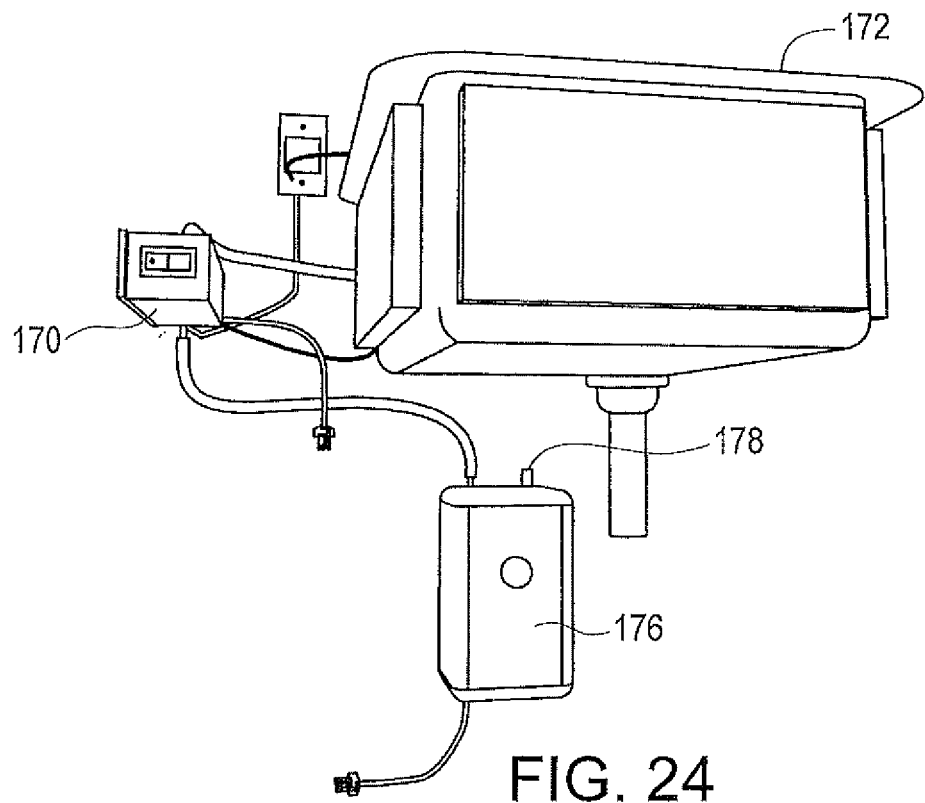
FIG. 24 is a lower perspective view of the appliance of FIG. 23 using the function of the sink faucet.

FIGS. 23 and 24 show an instant hot water dispenser as a heating source, as shown at 170 in FIG. 23 while retaining the function of the faucet, 174 in FIG. 23. Hot water is added to the sink water bath 172, with the excess water being drained into a sink drain pipe, as shown at 174. The control unit 176 operates a valve 178 to control the flow of hot water to the bath, with temperature sensors 180, which can be wired or wireless probes. In cooking situations where it is not necessary to fill an entire sink with water, a smaller container may be placed in the sink for cooking, and the excess water simply goes down the standard sink drain. Additionally, the hot water spout could be designed to pull out or to adjust the height in a way that would direct the water to reduce splashing and improve circulation. Tubing could also be attached to the faucet spout, fixture, or water tank and directed as needed to containers or accessory water distribution ports or racks.

Hence, a conventional kitchen sink or other water container can be utilized as a sous vide or bain-marie appliance. Heating units can be applied directly to the sink, for instance, or they can be a portable unit which is usable with an existing sink or other water container. The system may also be incorporated into the design or manufacturing of new sinks. Further, an instant hot water dispenser can be used which is part of an existing sink installation. Control systems and temperature sensors are used with each system to maintain the temperature of the water at the desired level in order to give the full sous vide effect. Multiple temperature zones may be controlled in the same sink or container to provide enhanced cooking techniques. In addition, a temperature sensor can be used inside the plastic bag containing the food or in some cases can be inserted directly into the item to be cooked itself. While the term water bath has been used in the descriptions, it should be understood that many liquids, gels, emulsions or phase-change materials (PCM) may be suitable for various cooking requirements and are included in this system. For example, a combination of water and cooking oil may be used. A layer of cooking oil could "float" on top of a layer of water to create more control over various thermal layers. Another technique could use temperature sensitive gels such as those made with agar, that turn from liquid to gel state below various temperatures. Using gel layers and various water layers could alter the thermal properties of each layer and provide increased flexibility for new innovative cooking techniques. Some temperature control cooking techniques might use liquids, gels, molds or containers that may be chilled or heated prior to placement in a water or liquid bath. In some situations the food itself, or portions of the food could be dipped or frozen with liquid nitrogen (−321° F.) in order to obtain the desired texture and temperature results.

Although a preferred embodiment of the invention has been disclosed for purposes of illustration, it should be understood that various changes, modifications and substitutions may be incorporated in the embodiment without departing from the spirit of the invention, which is defined by the claims which follow.

What is claimed is:

1. A sous vide system, comprising:
   a container having a bath adapted for sous vide operation having an amount of liquid present therein with a first temperature zone and a second temperature zone in the amount of liquid in the container, wherein the first temperature zone and the second temperature zone are separated without use of a divider and are utilized for cooking or cooling one or more foodstuffs within the first temperature zone and the second temperature zone, wherein the sous vide system includes 1) a first heating unit and a second heating unit or 2) the first heating unit and a cooling module adapted to establish and maintain the first temperature zone and the second temperature zone in the container, wherein at least one of the first heating unit or the second heating unit are further adapted to heat the liquid within a temperature range of 120° F. to 160° F. for at least the first temperature zone, operative for sous vide cooking, wherein the first heating unit is disposed at an upper portion of the container to actively heat and maintain the liquid residing in the first temperature zone at a first temperature or a first temperature range in order to cook or maintain a first portion of the one or more foodstuffs and the second heating unit or the cooling module is disposed at a lower portion of the container to actively heat or cool and maintain the liquid residing in the second temperature zone at a second temperature that is lower than the first temperature or a second temperature range that is lower than the first temperature range in order to cook, cool, or maintain a second portion of the one or more foodstuffs that is different than the first portion;
   a temperature control unit coupled to the first heating unit and the second heating unit or to the first heating unit and the cooling module; and
   a first temperature sensor and a second temperature sensor located within the container for providing feedback to the temperature control unit for the first temperature zone and the second temperature zone, wherein the first temperature sensor located within the container is adapted to monitor the first temperature of the liquid or the one or more foodstuffs present in the amount of liquid in the first temperature zone and the second temperature sensor located within the container is adapted to monitor the second temperature of the liquid or the one or more foodstuffs present in the amount of liquid in the second temperature zone, wherein the temperature control unit is responsive cooperatively with the first temperature sensor and the second temperature sensor to control and maintain the first temperature or the first temperature range in the first temperature zone and the second temperature or the second temperature range in the second temperature zone for respective periods of time to reach established different target temperatures for the one or more foodstuffs in the first temperature zone and the second temperature zone in the container.

2. The sous vide system of claim 1, wherein one or more of the first temperature zone and the second temperature zone are configured to be changed from heating to cooling.

3. The sous vide system of claim 1, wherein the first temperature zone is to cook the first portion of the one or more foodstuffs at the first temperature or the first temperature range at a same time as the second temperature zone is to cook the second portion of the one or more foodstuffs at the second temperature or the second temperature range.

4. The sous vide system of claim 1, wherein the container is a kitchen sink.

5. The sous vide system of claim 1, further comprising a rack assembly for supporting the one or more foodstuffs in the first temperature zone and the second temperature zone, wherein the one or more foodstuffs are disposed on the rack assembly, wherein the first portion of the one or more foodstuffs is located within the first temperature zone, and wherein the second portion of the one or more foodstuffs is located within the second temperature zone.

6. The sous vide system of claim 1, wherein the first heating unit is disposed on a first exterior surface of the container and the second heating unit or the cooling module are disposed on a second exterior surface of the container that is different than the first exterior surface.

7. The sous vide system of claim 1, wherein a third heating or cooling unit is disposed at a portion of the container that is different than the upper portion and the lower portion, wherein the third heating or cooling unit maintains the liquid residing in a third temperature zone at a third temperature that is different than the first temperature and the second temperature or a third temperature range that is different than the first temperature range and the second temperature range.

8. The sous vide system of claim 7, wherein the third heating or cooling unit is disposed between (1) the first heating unit and (2) the second heating unit or the cooling module, wherein the third temperature zone is between the first temperature zone and the second temperature zone, and wherein the third temperature is between the first temperature and the second temperature and the third temperature range is between the first temperature range and the second temperature range.

9. The sous vide system of claim 7, wherein the third heating or cooling unit is disposed above the first heating unit, wherein the third temperature zone is above the first temperature zone, and wherein the third temperature is higher than the first temperature and the third temperature range is higher than the first temperature range and the second temperature range.

10. The sous vide system of claim 7, wherein the third heating or cooling unit or the cooling module is below the second heating unit or the cooling module, wherein the third temperature zone is below the second temperature zone, and wherein the third temperature is lower than the second temperature and the third temperature range is lower than the second temperature range.

11. The sous vide system of claim 1, wherein the first heating unit and the second heating unit or the first heating unit and the cooling module are disposed on an exterior surface of the container.

12. A system, comprising:
a container having a bath having an amount of liquid present therein with at least three temperature zones in the amount of liquid in the container, wherein the at least three temperature zones have different selected temperatures for cooking a foodstuff, in the at least three temperature zones, wherein a first temperature zone of the at least three temperature zones is located in a lower portion of the container, a second temperature zone of the at least three temperature zones is located in an upper portion of the container that is above the lower portion, and a third temperature zone of the at least three temperature zones is located in the container between the lower portion and the upper portion, wherein the system includes 1) a first heating or cooling unit disposed at the lower portion of the container to actively heat and maintain the liquid residing in the first temperature zone at a first temperature or a first temperature range in order to cook, cool, or maintain a first portion of the foodstuff, 2) a second heating or cooling unit disposed at the upper portion of the container to actively heat or cool and maintain the liquid residing in the second temperature zone at a second temperature that is higher than the first temperature or a second temperature range that is higher than the first temperature range in order to cook, cool, or maintain a second portion of the foodstuff that is different than the first portion, and 3) a third heating or cooling unit disposed between the lower portion of the container and the upper portion of the container to maintain the liquid residing in the third temperature zone at a third temperature that is between the first temperature and the second temperature or a third temperature range that is between the first temperature range and the second temperature range in order to cook, cool, or maintain a third portion of the foodstuff that is different than the second portion;
a temperature control unit coupled to the first heating or cooling unit, the second heating or cooling unit, and the third heating or cooling unit; and
a plurality of temperature sensors located within the container for providing feedback to the temperature control unit for the at least three temperature zones, wherein a first temperature sensor of the plurality of temperature sensors located within the container is adapted to monitor the first temperature or the first temperature range of the liquid or the foodstuff present in the amount of liquid in the first temperature zone, a second temperature sensor of the plurality of temperature sensors located within the container is adapted to monitor the second temperature or the second temperature range of the liquid or the foodstuff present in the amount of liquid in the second temperature zone, and a third temperature sensor of the plurality of temperature sensors located within the container is adapted to monitor the third temperature or the third temperature range of the liquid or the foodstuff present in the amount of liquid in the third temperature zone.

13. The system of claim 12, wherein the first heating or cooling unit, the second heating or cooling unit, and the third heating or cooling unit are disposed on an exterior surface of the container.

14. A system, comprising:
a container having a bath having an amount of liquid present therein with at least two temperature zones in the amount of liquid in the container, wherein the system includes 1) a first heating or cooling unit disposed at an upper portion of the container to actively heat or cool and maintain the liquid residing in a first temperature zone of the at least two temperature zones at a first temperature or a first temperature range in order to cook, cool, or maintain a first portion of a foodstuff and 2) a second heating or cooling unit disposed at a lower portion of the container to actively heat or cool and maintain the liquid residing in a second temperature zone of the at least two temperature zones at a second temperature that is lower than the first temperature or a second temperature range that is lower than the first temperature range in order to cook, cool, or maintain a second portion of the foodstuff that is different than the first portion;
a temperature control unit coupled to the first heating or cooling unit and the second heating or cooling unit; and
a plurality of temperature sensors located within the container for providing feedback to the temperature control unit for the at least two temperature zones, wherein a first temperature sensor of the plurality of temperature sensors located within the container is adapted to monitor the first temperature or the first temperature range of the liquid or the foodstuff present in the amount of liquid in the first temperature zone and a second temperature sensor of the plurality of temperature sensors located within the container is adapted to monitor the second temperature or the second temperature range of the liquid or the foodstuff present in the amount of liquid in the second temperature zone.

15. The system of claim 14, wherein the first heating or cooling unit is disposed at a first location of an exterior of the container associated with the first temperature zone and the second heating or cooling unit is disposed at a second location of the exterior of the container associated with the second temperature zone.

16. The system of claim 15, wherein the first location and the second location are on a same surface of the exterior of the container.

17. The system of claim 15, wherein the first location is on a first surface of the exterior of the container and the second location is on a second surface of the exterior of the container that is different than the first surface.

18. The system of claim 14, wherein the a third heating or cooling unit is disposed at a portion of the container that is different than the upper portion and the lower portion, wherein the third heating or cooling unit maintains the liquid residing in a third temperature zone at a third temperature that is different than the first temperature and the second temperature or a third temperature range that is different than the first temperature range and the second temperature range.

19. The system of claim 12, wherein at least one of:
   the first heating or cooling unit is configured to maintain the first portion in a frozen state;
   the second heating or cooling unit is configured to maintain the second portion in the frozen state; or
   the third heating or cooling unit is configured to maintain the third portion in the frozen state.

20. The sous vide system of claim 1, wherein the sous vide system includes the first heating unit and the cooling module.

\* \* \* \* \*